United States Patent [19]

Cole et al.

[11] Patent Number: 4,579,773
[45] Date of Patent: Apr. 1, 1986

[54] LAMINATES

[75] Inventors: Bill W. Cole; Gary T. Brooks, both of Naperville, Ill.

[73] Assignee: Standard Oil Company (Indiana), Chicago, Ill.

[21] Appl. No.: 642,405

[22] Filed: Aug. 20, 1984

[51] Int. Cl.$^4$ .......................... B32B 7/00; B32B 27/06
[52] U.S. Cl. ..................................... 428/260; 428/268; 428/290; 428/473.5; 428/474.4; 428/474.7; 428/477.7
[58] Field of Search ................ 528/182, 26, 183, 189, 528/179; 524/323, 600; 428/473.5, 474.4, 474.7, 477.7, 260, 268, 290

[56] References Cited

U.S. PATENT DOCUMENTS

| | | | |
|---|---|---|---|
| 3,347,828 | 10/1967 | Stephens et al. | 528/182 |
| 3,494,890 | 2/1970 | Morello | 528/179 |
| 3,573,260 | 3/1971 | Morello | 528/183 X |
| 3,661,832 | 5/1972 | Stephens | 524/323 |
| 3,847,867 | 11/1974 | Heath et al. | 528/26 |
| 4,136,085 | 1/1979 | Hanson | 528/189 |
| 4,302,575 | 11/1981 | Takekoshi | 428/473.5 X |
| 4,313,868 | 2/1982 | Hanson | 524/600 |
| 4,346,212 | 8/1982 | Robinson et al. | 428/473.5 X |
| 4,394,467 | 7/1983 | Edelman | 428/473.5 |
| 4,467,011 | 8/1984 | Brooks et al. | 428/473.5 X |

Primary Examiner—Thomas J. Herbert
Attorney, Agent, or Firm—Robert G. Ladd; William T. McClain; William H. Magidson

[57] ABSTRACT

Novel fiber fabric laminates impregnated with polyamide-imide and polyamide-imide-phthalamide copolymers are disclosed. The laminates are useful as engineering materials for the replacement of metals.

29 Claims, No Drawings

LAMINATES

FIELD OF THE INVENTION

The field of this invention relates to fiber fabric laminates impregnated with polyamide-imide and polyamide-imide phthalamide copolymers. It also relates to polyamide-imide/polyetherimide blends as the matrix resin for fiber woven laminates.

BACKGROUND

Amide-imide polymers and copolymers are a relatively new class of organic compounds known for their solubility in nitrogen-containing organic solvents when in the largely polyamide form. In the past, the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977) and 3,573,260 (1971). U.S. Pat. No. 4,136,085 (1979), U.S. Pat. No. 4,313,868 (1982), and U.S. Pat. No. 4,309,528 (1982) are incorporated herein by reference. These polyamides-imides are known for their outstanding mechanical properties; but they are also difficult to process and it is particularly difficult to form laminates from them. This difficulty is a consequence of insufficient flow of the polymer. The art has been looking for improvements in the flow and reduction in melt reactivity during fabrication of the polymers, but it is essential that an additive not impair the excellent mechanical properties of the amide-imide polymers and copolymers, when forming the laminate.

The general object of this invention is to provide amide-imide/amide-imide-phthalamide copolymers as the matrix resin for fiber laminates. Another object is to provide polyamide-imide/polyetherimide blends as the matrix reinforcer for fiber laminates wherein the polyethermide moiety is about 0.1 to about 50 percent. A more specific object of this invention is to provide polyamide-imide and polyamide-imide phthalamide impregnated woven fiber laminates, wherein the polyamide-imide moiety is about 95 to about 20 weight percent and the polyamide-imide-phthalamide moiety is about 5 to about 80 weight percent of the total coating added. Other objects appear hereinafter.

We have now found that amide-imide polymers and copolymers obtained by reacting a polycarboxylic acid anhydride with one primary diamine or a mixture of primary diamines containing about 5 to about 80 percent by weight of polyamide-imide-phthalamide moieties produce excellent impregnation resins for fiber laminates. When polyamide-imide alone is used, higher molding pressures are required. Suitable polyamide-imide phthalamides which can be used with polyamide-imides as impregnating resins for fiber laminates comprise recurring polyamide A units of:

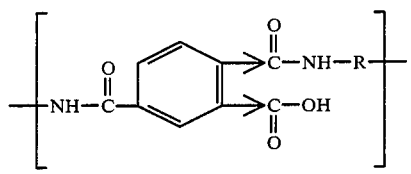

which are capable of undergoing imidization and polyamide B units of:

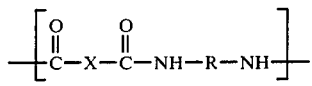

wherein the molar ratio of A units to B units is between about 80 to 20 and about 20 to 80, wherein R is a divalent aromatic hydrocarbon radical of from about 6 to about 20 carbon atoms or two divalent hydrocarbons joined directly or by stable linkages selected from the group consisting of —O—, methylene, —CO—, and —SO$_2$—, and wherein X is a divalent aromatic radical and T denotes isomerization.

In the injection molded form, the polyamide A units have converted to the polyamide-imide A' units and the copolymer is comprised of recurring polyamide-imide A' units of:

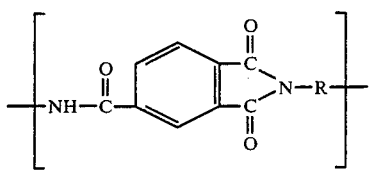

and polyamide B' units of:

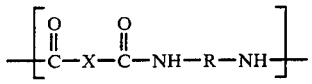

wherein the molar ratio of A' to B' units is about 80 to about 20 to about 20 to about 80, preferably about 1 to about 1, and wherein R and X are defined as above.

The polyamide-imide phthalamides are prepared from acyl halide derivatives of dicarboxylic acid, such as isophthalic acid or terephthalic acid and an anhydride-containing substance and aromatic diamines. Useful acyl halide derivatives of dicarboxylic acid include:

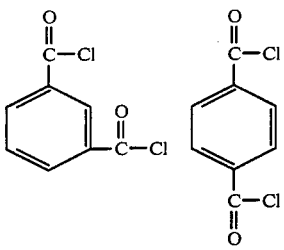

and related compounds. Suitably, the anhydride-containing substance is an acyl halide derivative of the acid anhydride having a single benzene or lower-acyl-substituted benzene ring. The preferred anhydride is the four-acid chloride of trimellitic anhydride (4-TMAC).

Useful aromatic diamines include para- and meta-phenylenediamine, oxybis (aniline), thiobis (aniline), sulfonylbis (aniline), diaminobenzophenone, methylenebis (aniline), benzidine, 1,5-diaminoaphthalene, oxybis (2-methylaniline), thiobis (2-methylaniline), 2,2-bis-4-(p-aminophenoxy)phenylpropane, bis-4-(p-aminophenoxy)phenylsuflone, 2,2-bis-4-(p-aminophenoxy)phenylhexafluoropropane, bis-4-(p-aminophenoxy)benzene, bis-4-(3-aminophenoxy)benzene, and the like. Examples of other useful aromatic primary diamines are set out in U.S. Pat. No. 3,494,890 (1970) and U.S. Pat. No. 4,016,140 (1977) both incorporated herein by reference. The preferred diamine is methaphenylenediamine.

The amount of the polyamide-imide-phthalamide added to the polyamide-imide polymer can be about 5.0 to about 80 weight percent, usually in the range of about 10 to about 20 weight percent. The polyamide-imide-phthalamide is miscible in our amide-imide polymers, thus forming a single glass transition (Tg) matrix. When about 20 weight percent of the polyamide-imide-phthalamide was dry blended with out amide-imide polymer and molded, a single Tg was found. The Tg of our amide-imide polymer used as a control was about 230° C. to about 240° C., as molded, while the polymer containing 20 percent by weight of polyamide-imide-phthalamide also had a glass transition temperature of about 230° C. to about 240° C. After being cured at a temperature of about 160° C. to about 260° C., the glass transition temperature for our control polyamide-imide polymer rose to about 270° C. and for the sample containing 20 percent polyamide-imide-phthalamide the glass transition temperature also rose to 270° C.

It should be particularly emphasized that when our polyamide-imides are blended with polyamide-imide-phthalamide, a one-phase miscible polyamide-imide/polyamide-imide-phthalamide system is obtained. This is critical in the effectiveness of our process and our novel laminate compositions, since if a one-phase miscible system is not formed, delamination of the incompatible components can readily occur with a multiphase polymer system.

The polyamide-imides are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (3000–13,000 as prepared) polymeric compounds having, in their molecule, units of:

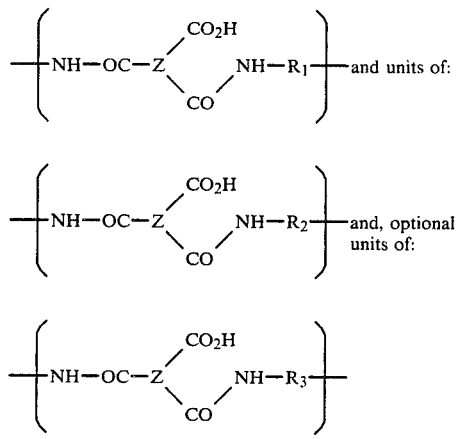

wherein the free carboxyl groups are ortho to one amide group, Z is an aromatic moiety containing 1 to 4 benzene rings or lower-alkyl-substituted benzene rings; $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, or —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating, by which they form the polyamide-imide structure having, to a substantial extent, recurring units of:

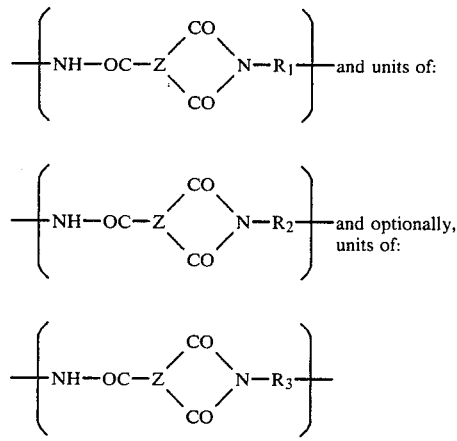

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

We can use a single diamine but, usefully, the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group. When three diamines are used, they are preferably selected from the class composed of:

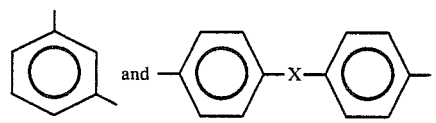

said X being an —O—, —CH$_2$—, or —SO$_2$— group. More preferably, the mixture of aromatic primary diamines is in the one-component or two-component system and is composed of meta-phenylenediamine, p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one-component system, the preferred diamines are oxybis(aniline) or meta-phenylenediamine. The aromatic nature of the diamines provides the excellent thermal properties of the copolymers while the primary amine groups permit the desired imide rings and amide linkages to be formed.

Usually, the polymerization or copolymerization is carried out in the presence of a nitrogen-containing organic polar solvent such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° C. to about 50° C.

The reaction time is not critical and depends primarily on the reaction temperature. It may vary from about 1 to about 24 hours, with about 2 to 4 hours at about 30° C. to about 50° C. being preferred for the nitrogen-containing solvents.

We also have found that if about 0.1 to about 50 percent of the polyamide-imide polymer is replaced with about 0.1 to about 50 percent by weight of polyetherimide, the resulting polymer composition is a superior matrix resin for fiber laminates and particularly for carbon fiber laminates.

Suitable polyetherimides comprise essentially chemically combined units of the formula:

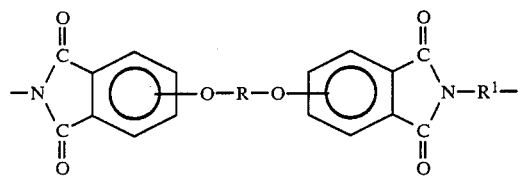

(I)

where R is a member selected from the class consisting of (a) the following divalent organic radicals:

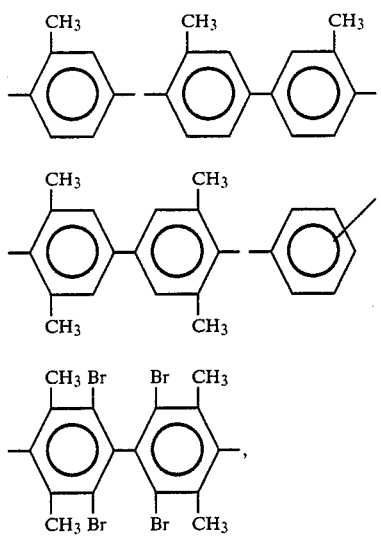

and

-continued

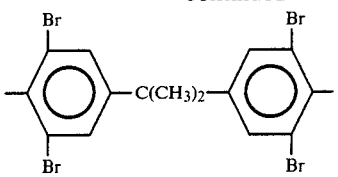

and (b) divalent organic radicals of the general formula:

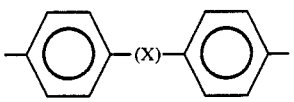

where X is $-C_yH_{2y}-$, y is a whole number equal to 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula:

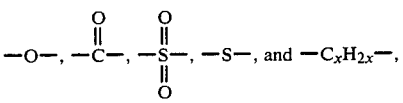

(II)

where Q is a member selected from the class consisting of:

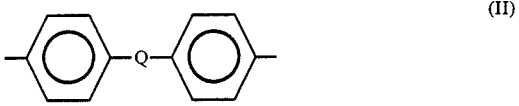

and x is a whole number equal to 1 to 5, inclusive.

We have unexpectedly discovered that blends of polyamide-imide polymers and polyethermides, disclosed herein, range can be made over a wide range in which the properties of the blend show a marked average improvement over the properties of the components of these blends. The improvements in properties of the blends are unexpected to a person skilled in the art, considering the proportion of either the polyamide-imide or the polyetherimide used. In our novel blends, synergistic results are obtained which are not characteristic of either blend and the application for our blends is of a much greater range than for the unblended material. In addition, by blending the polyamide-imide with polyetherimides, products can be obtained which are lower in cost than products which are usually produced by the use of the polyamide-imide alone without significant sacrifice, if any, in thermal properties.

A preferred class of polyethermidies which is included by formula (III) consists of polymers comprising of from about 2 to 5000 or more units and, preferably, from about 5 to about 100 units of the formula:

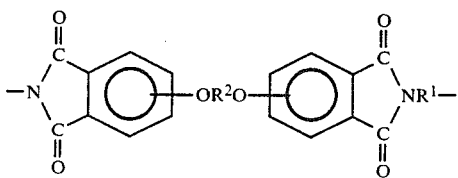

where R¹ is as previously defined, and R² is:

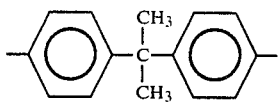

Included by the polyetherimides of formula III are polymers comprising the following chemically combined units:

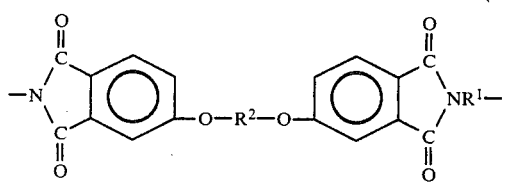

(IV)

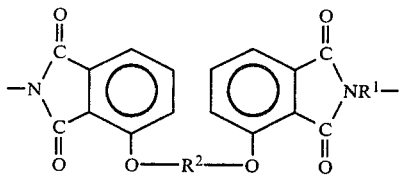

(V)

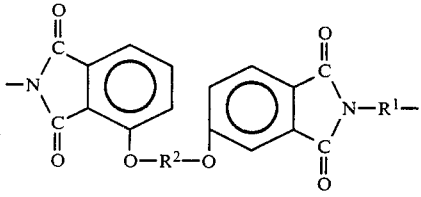

(VI)

and mixtures thereof, where R¹ and R² are as defined above.

The polyetherimides of formulas III-IV can be made by effecting reaction between an aromatic bis(etheranhydride) of the general formula:

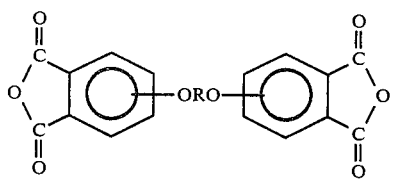

(VII)

and an organic diamine of the general formula:

H$_2$NR$^1$NH$_2$    (VIII)

where R and R¹ are as previously defined.

There can be employed from 0.95 to 1.05 mols of aromatic bis(etheranhydride) per mol of organic diamine.

In making the polyetherimides, there are employed from 0.95 to 1.05 mols of the aromatic dianhydride of formula VII per mol of the organic diamine of formula VIII. Preferably, one can employ equal or lower amounts of the bisanhydride and diamine.

The aromatic bis(etheranhydride) of formula VII, shown in the above-mentioned U.S. Pat. No. 3,847,867, can be prepared from the hydrolysis followed by dehydration of the reaction product of the nitro-substituted phenyl dinitrile and then continuation of the reaction with a dialkali metal salt of a dihydric aryl compound in the presence of a dipolar aprotic solvent, where the alkali metal salt has the general formula:

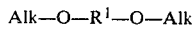Alk—O—R$^1$—O—Alk where R¹ has the meaning given above and preferably is the same as R² and Alk is an alkali metal ion. Various well-known procedures can be used to convert the resulting tetranitriles to the corresponding tetraacids and dianhydrides.

The amount of the polyetherimide added to the polyamide-imide polymer can be about 0.1 to about 50 weight percent, usually in the range of about 2 to about 20 weight percent.

Laminates of amide-imide copolymer solution-impregnated fiber woven fabric have been produced at lower molding pressures when about 5 to about 80 percent by weight of the polyamide-imide-phthalamide is added to the impregnation solution.

High performance composites are usually made by lamination, i.e. the fixing together of sheets of aligned fiber reinforced polymers. The fiber directions used are chosen to suit the magnitudes and directions of the stresses that are expected to be encountered. The alignment of these reinforcement fibers can be in the same direction in unidirectional layups such as unitape and unidirectional fabric. Additionally, each successive layer of the laminate can have different fiber direction from the previous one, except for the two layers at the center. Typically, the fiber direction in each successive layer of the laminate can be shifted, for example, by 30°, 45°, or 90° from the previous layer. Usually the layers are "balanced", i.e. they consist of an even number of sheets, arranged so that the interface between the two sheets at the center is a mirror plane of symmetry. This is to avoid unwanted twisting and other distortions which occur with unbalanced laminates when the laminate is stressed. Very high volume fractions of reinforcement can be obtained in laminates, and this is much the most efficient way of providing bi-directional or approximately transversely isotropic reinforcement. The fiber used for reinforcement can be any material which can be processed as a continuous filament and has a modulus of 10,000,000 psi or greater and is thermally stable to at least 600° F. for at least 10 minutes. By thermally stable is meant the fiber emits insufficient volatiles to cause voids in the final composite structure. While any high temperature stable fiber material can be used according to the present invention, such as glass fibers, alumina, steel, silicon nitride, silicon carbide, boron, Kevlar, carbon fiber or the like.

The term carbon fiber is used herein in the generic sense and includes graphite fibers as well as amorphous carbon fibers which result after a thermal carbonization or graphitization treatment. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction. Graphite fibers generally have a higher Young's modulus than do amorphous carbon fibers and in addition are more highly electrically and thermally conductive.

The reinforcement fibers are coated or sized with a polyamic acid, an amide-imide polymer, an amide-imide copolymer or mixtures of these materials (hereinafter collectively referred to as amide-imide polymers or alternatively polyamide-imide). These materials are prepared from an anhydride-containing substance and a mixture of wholly- or partially-aromatic primary diamines or fully or partially acylated diamines. The amide-imide polymer sizing agents can be applied to the fiber in a suitable solvent, which is non-reactive with the sizing agent, to control the amount of size coated onto the fiber. The presence of solvent will improve the ability of the sizing agent to penetrate into the individual fibers of a staple yarn, filament yarn, or roving. The concentration of the size in the solvent is usually in the range of from about 0.05 to about 10%, and preferably from about 0.5 to about 5% by weight, based on the total weight of the solution. Examples of suitable solvents are N-methylpyrrolidone (NMP), N,N-dimethylformamide (DMF), N,N-dimethylacetamide (DMAC) and methyl ethyl ketone. Other materials to aid in the removal of the solvent such as methylene chloride and the like can be added to the solvent.

The reinforcement fibers sized with amide-imide polymers are used to form reinforcement material for continuous fiber, unidirectional tape, and woven fabric for which amide-imide polymers are used as the matrix resin. These amide-imide polymers may be modified with other polymeric materials to improve the flow properties of the polymer matrix during molding or consolidation. Examples of these modifier polymers are amorphous and semi-crystalline polyamides or polyetherimides.

Amorphous or semi-crystalline polyamides have also been found to aid the manufacture of amide-imide impregnated carbon woven fiber laminates and chopped fiber molding compounds. Suitable amorphous polyamides have both aromatic and aliphatic moieties. Advantageously, the amorphous polyamide comprises recurring units of the following structure:

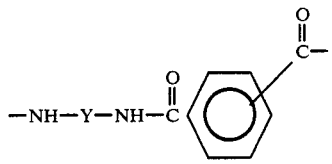

wherein Y is a straight chain of one to six methylene groups, said chain being substituted by at least one alkyl group, the total number of side chain carbon atoms introduced by the alkyl substitution being at least one.

Another amorphous polyamide group suitable for use in improving the melt flow and reducing the melt reactivity of our amide-imide polymer has the following structure:

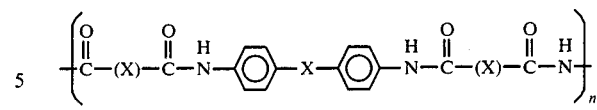

Amorphous polyamides of the following structure are preferred for use in our process to modify the polyamide-imides to improve flow during the consolidation phase of the laminate formation.

The amorphous polyamide, Trogamid-T, manufactured by the Dynamit Nobel Company, has the following structure and is particularly useful in improving the flow properties and reducing the melt reactivity of the polyamide-imide:

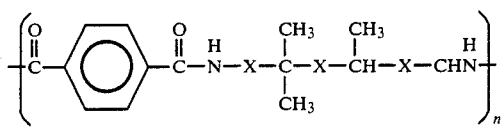

wherein X is $CH_2$.

Another very useful amorphous polyamide is Amidel, manufactured by Union Carbide Company and having the following structure:

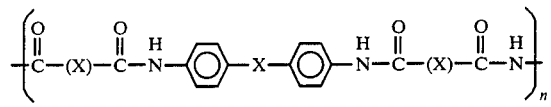

more particularly wherein the first X is $(CH_2)_7$, the second X is $CH_2$, and the third X is $(CH_2)_4$.

Other useful polyamides include the Upjohn amorphous polyamide of the following structure:

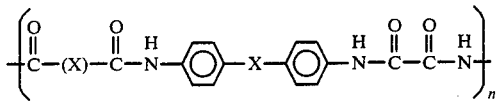

wherein the first X is $(CH_2)_9$ and the second X is $CH_2$, and the copolyamide of the following structure:

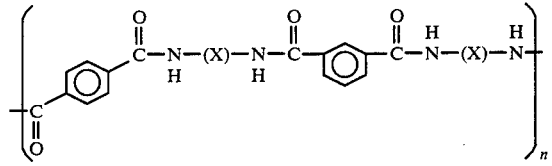

wherein X is $(CH_2)_6$.

In all of the foregoing structures X can be a straight chain of one to five $CH_2$ groups. X can be the same or different in each amorphous polyamide moiety. Some of the semi-crystalline polyamides which increase the amide-imide polymer flow properties without significantly altering the glass transition temperature of the amide-imides polymers are: nylon 6/6, nylon 6, nylon 6/12, nylon 11, nylon 12, etc. The amorphous polyamides are ordinarily used in quantities ranging from about 0.1–20 weight percent while the semi-crystalline materials are used in amounts of about 0.1–5 weight percent.

Unidirectional tape (unitape) formed by parallel reinforcement fiber bundles forming tape widths of 0.25 inch to 24 inch can be impregnated with polyamide-imide matrix resin in the following manner. The unitape is placed on release paper on a table or platen heated to a temperature of 100° to 200° F. The release paper can be polyethylene coated paper. A concentrated solution of polyamide-imide in a suitable solvent such as NMP is pressed into the reinforcement fibers of the unitape and worked into the tape to provide uniform wetting and impregnation of the reinforcement fibers. The solution contains a solids concentration of 45 to 70% polyamide-imide in the solvent. A second release paper can be placed on top of the unitape after the matrix resin solution has been added before the unitape is pressure rolled. The solvent is removed by heating the unitape to a temperature of 300°–500° F. The unitape is cooled to room temperature and rolled up on a roll for shipment having a residual solvent content of 1 to 10%.

For single fiber or multiple fiber bundles up to 0.25 inch in diameter, these continuous fibers are impregnated with polyamide-imide by dip coating the continuous filament in a dip bath containing the impregnation material. The dip bath can be operated at room temperature to 200° F. with a solids content of 25 to 40% polyamide-imide in a suitable solvent. The continuous filament is dried at temperatures of 300° to 500° F. and wound to form packages for use in spiral winding, pultrusion, and the like. The residual solvent content is about 1 to 10%.

The term "composite structure" is defined herein as fiber reinforced fabric, tape or broadgoods which has been impregnated with amide-imide polymer and is also referred to herein as "prepreg". In a batch operation, an appropriate quantity of the reinforcement fiber is spread in a parallel lay-up on a flat surface to the thickness and width needed. A measured quantity of resin is added to the fibers. The resin may be in a solvent, to improve uniformity of impregnation, with the solvent removed after coating.

In a continuous operation, the fibers, tapes, or fabrics can be spread and resin added by passing over and through a series of appropriately spaced rolls above and within a container of the matrix resin or resin/solvent mixture. The solvent is removed by passage through a heating zone at a temperature sufficient to evaporate the solvent. Otherwise, the fibers can be impregnated by the so called melt transfer technique, where the resin is transferred to the fiber by contact with a moving belt containing the resin at a temperature high enough to maintain the resin in a plastic state without the addition of solvent.

Laminates of the desired thickness are formed by using multiple layers of prepreg and subsequently placing the layers under sufficient temperature and pressure to form a substantially void free laminate.

In a preferred method, a carbon fiber woven fabric for prepreg preparation, is formed by impregnating carbon fiber woven fabric with amide-imide polymer. The carbon fiber used to form the fabric is sized with amide-imide polymer to aid in the adhesion of the carbon fiber to the matrix resin. The fabric is drawn through a dip tank which contains a 25 to 40% solution of the amide-imide polymer in NMP solvent at a temperature in the range of room temperature to 200° F. The woven fabric must have sufficient residence time in the dip tank provided with numerous rollers to completely "wet-out" the fabric and provide for complete impregnation of the fabric with matrix resin. As the fabric exits the dip tank it must pass through nip rolls to control the solution/dry polymer content on the fabric. The dry resin content of the fabric is in the range of 30 to 50 weight percent based on the fabric. The prepreg is dried at 300° to 500° F. to give a residual solvent content of 1 to 10 weight percent.

Dried prepreg is cut to the desired dimensions and placed on a metal place which each successive layer tacked together in some manner to form a lay-up. The number of layers or plys depends on the desired thickness of the laminate. Release and breather fabrics are placed on top of the lay-up with the breather fabric extending beyond the edges of the prepreg. Material to form a vacuum bag is placed over the lay-up and a vacuum bag is formed. The entire assembly of the lay-up in a vacuum bag is placed in a hydraulic press or a vacuum-bag autoclave. After forming a vacuum in the bag, the assembly is heated to the range of 660° F., allowed to equilibrate, and a pressure of 100 to 500 psig is applied for about 5 to 30 minutes. The assembly is allowed to cool under pressure before the laminate is removed from the assembly.

The following examples illustrate the preferred embodiments of the invention. It will be understood that the examples are for illustrative purposes only and do not purport to be wholly definitive with respect to conditions or scope of the invention.

EXAMPLE I

A 200-ml., round-bottom, 4-neck flask, equipped with a nitrogen inlet tube, stirrer, thermometer, and solids addition funnel, was charged with 99.9 (pbw) parts by weight of p,p'-oxybis(aniline) (OBA), 23.1 pbw meta-phenylenediamine (MPDA) and 604 pbw N-methylpyrrolidone (NMP). When solution at room temperature (72° F.) was complete, 142.5 pbw 4-trimellitoyl anhydride chloride (4-TMAC), having a purity of 99.5 percent ±0.5 percent as determined from chloride content and 6.8 pbw of trimellitic anhydride (TMA) were added over 2.5 hours while maintaining a solution temperature of between 77°–95° F. When addition was complete the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments of 3000 pbw each of distilled water to remove hydrogen chloride that had been generated during reaction.

The solid was dried under a vacuum of 20 inches of mercury for 24 hours at 122° F. The above material was heated for 2 hours in an oven dryer set at 375°–450° F. to give the final product.

EXAMPLE II

A 200-ml., round-bottom, 4-neck flask, equipped with a nitrogen inlet tube, stirrer, thermometer, and solids addition funnel, was charged with 99.9 parts by weight (pbw) of p,p'-oxybis(aniline) (OBA), 23.1 pbw meta-phenylenediamine (MPDA) and 604 pbw N-methylpyrrolidone (NMP). When solution at room temperature (72° F.) was complete, 144.0 pbw 4-trimellitoyl anhydride chloride (4-TMAC), having a purity of 99.5 percent ±0.5 percent as determined from chloride content and 5.5 pbw of trimellitic acid anhydride (TMA) was added over 2.5 hours while maintaining a solution temperature of between 77°–95° F. When addition was complete, the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments each of 3000 pbw of distilled water to remove hydrogen chloride that had been generated during reaction.

The solid was dried under a vacuum of 20 inches of mercury for 24 hours at 122° F. A 2 gram sample heated for 20 min. of 500° F. in an air-circulating oven showed a volatile's content of 10%.

A 2000-ml., round-bottom, 4-neck flask, equipped with a nitrogen inlet tube, stirrer, thermometer, and solids addition funnel was charged with 1000 pbw of NMP. After bringing the flask contents to 50°–60° C., 598 pbw of the solid prepared are added with stirring. Solution is effected after stirring for 2-3 hrs at 50°–60° C. After cooling to 25° C., the viscosity is 158 poises with a determined solids content of 37.8% (Sample of 2 g heated for 2 hrs at 200° C.).

EXAMPLE III

A sample of polymer as prepared by the method of Example 1 was heated for 2 hours in an oven dryer with a temperature range of 375°–450° F.

EXAMPLE IV

Metaphenylenediamine (540 g) and acetic acid (900 ml) were placed in a five-liter, three-necked, round-bottom flask equipped with mechanical stirrer, pressure equalizing addition funnel and nitrogen sparge tube, and distillation head and condenser. The nitrogen sparge was set at 300 cc/min and 765 g of acetic anhydride was added over 5 min. This was followed by the addition of 415 g of isophthalic acid and 480 g of trimellitic anhydride. The temperature of the bottom half of the spherical heating mantle surrounding the flask was set at 700° F. and the top half of the mantle was heated with a Variac set at 50. After 105 min., 1730 ml. of distillate were collected and the polymer had become very viscous. The heat was turned off and the polymer was cooled under nitrogen.

EXAMPLE V

A 690-gram portion of dimethylacetamide (DMAC) was stirred and cooled to 5° C. with dry nitrogen purging to keep the system dry. An intimate mixture composed of 252.2 grams of 4-TMAC, 119.0 grams of p′,p-methylene-bis(aniline) (MBA), and 120.0 grams of OBA was then added to the solvent over a period of 30 minutes. The temperature of the reaction was allowed to rise to 50° C. At that temperature, it was controlled by means of an ice bath. An additional 100 grams of DMAC were then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443-gram yield of the copolymer was obtained.

EXAMPLE VI

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time, the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE VII

The general procedure for preparing a copolymer containing three diamines is illustrated by the reaction of OBA, MPDA, MBA and 4-TMAC in DMAC. Thus, a 242.0-gram portion of OBA (1.21 moles), a 130.7-gram portion of MPDA (1.21 moles) and a 239.6-gram portion of MBA (1.21 moles) were dissolved in 3900 grams DMAC contained in a 6-liter flask equipped with a nitrogen purge, stirrer, addition funnel and thermometer. A 765-gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the 4-TMAC addition was completed, any residual 4-TMAC clinging to the addition funnel was completely washed into the reaction solution with 70 grams DMAC. A heating mantle was applied to the reaction flask and the temperature quickly rose (about 20 min.) to 50° C. The reaction solution was stirred at 50° C. for 90 minutes and then the solution precipitated by admixing with water. Prior to precipitation, the solution viscosity was about 7.5 stokes (25° C., 20 percent solids). The polymer was precipitated in distilled water in a model D, W. J. Fitzpatrick Company, comminuting machine (Fitz mill). After precipitation, the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12-15 hours.

EXAMPLE VIII

A 10-gal., glass-lined Pfaudler kettle equipped with a water-cooled jacket and nitrogen inlet was charged with 9.87 lbs. of MPDA, 0.35 lbs. of trimellitic anhydride and 59.2 lbs. of N-methylpyrrolidone. After solution had occurred under a nitrogen purge, an intimate blend of 9.52 lbs. of 4-trimellitoyl anhydride chloride and 9.17 lbs. of isophthaloyl dichloride was added over 2.5 hrs. keeping the temperature below 35° C. The resulting viscous solution was brought to 50° C. When the Gardner viscosity had reached a Z1 viscosity, the solution was precipitated by passage through a Fitzpatrick comminuting mill. The polymer product was washed five times with deionized water followed by air-drying on a filter for 3 days. The product was then brought to a solids content of J98% by heating in a forced air oven for 2 hrs. at 470° F.

EXAMPLE IX

A round-bottom, 2000-ml., 4-necked flask was charged with 1045 g dry NMP, 162.1 g (1.5 mol) of MPDA, and 4.3 g of TMA (0.0225 mol). The flask was equipped with a mechanical stirrer, nitrogen inlet tube, thermometer, and a liquid addition funnel. During solution of the diamine and TMA, the addition funnel was charged with 248.0 g (1.178 mol) of 4-TMAC and 60.9 g (0.30 mol) isophthaloyl dichloride (IPCL$_2$) and melted at 80° C. When melting was complete, the solution of acid chlorides was added to the diamine/TMA solution over a 2-hour period at 25°–35° C. After addition was complete, the viscous solution was heated to 50° C. and held for 1 hour.

EXAMPLE X

The polyamide-imide-phthalamide prepared as in Example IX was dissolved in NMP. This solution, having a solids content of 27.5 percent, was blended with a polyamide-imide prepared as in Example I and dissolved/NMP solution (27.5 percent solids) at an 80:20 weight ratio. The polyamide-imide solution was first heated to 150° F. The polyamide-imide-phthalamide solution was then added, and the blend was stirred with a high shear mixer for four hours. The blended solution was allowed to cool and sit 16 hours before using.

The blended solution of polyamide-imide and amide-imide-phthalamide copolymers was used to coat graphite fiber woven fabric. The W322 plain weave fabric was cleansed with NMP solvent to remove the epoxy fiber size. The laminates formed from these blends and a control are listed in the Table below.

TABLE 1

| Sample | Molded Pressure, psi | Short Beam Shear (SBS), ksi |
|---|---|---|
| Control | 1500 | 8.0 |
| Blend | 1500 | 10.0 |

The blend coating resulted in improved polymer flow during molding as indicated by increased flash and by improved wetting of the surface fiber.

We have demonstrated the use of polyamide-imide (PAI)/polyetherimide (PEI) blends as matrix materials for laminates of continuous carbon fiber composites. Numerous amide-imide polymers have been evaluated as matrix materials. Furthermore, numerous blends of polyamide-imide with other polymers have been evaluated as matrix materials. Of the candidates evaluated, the PAI/PEI blends demonstrate the best flow characteristics in press molded laminates; i.e., the best potential for reducing the pressure required to mold good quality laminates. Furthermore, the PAI/PEI blends have excellent resistance to microcracking during thermal excursions, and they have excellent green (as molded) properties. Polyamide-imide as prepared as shown in Example I is the PAI material that has been used in this work.

It has been demonstrated that PAI polymers have very desirable mechanical properties when used as matrix materials for carbon fiber composites. Potential application of these materials has been limited, however, by the high pressures (1000 to 1500 psi) required to achieve fully consolidated laminates. State-of-the-art composite materials for aircraft structures are molded at 100 to 200 psi. Improving the processability of PAI laminates such that good quality laminates are produced at 100 to 200 psi makes these products useful in the aircraft structures market.

Specifically, this invention includes laminates prepared by coating fiber woven fabrics with blended solutions of polyamic acid (PA) and polyetherimide (PEI). Polyamic acid is a midstream product of the polyamide-imide process and contains about 80 to about 90 mole percent amic acid groups and about 20 to about 10 mole percent imide groups. Solutions are prepared from both polymers in N-methyl-2-pyrrolidone (NMP) solvent with solids levels ranging from 20 to 50 percent. The two polymer solutions are mixed at a temperature of about 300° F., to yield a homogeneous blended solution. It has been shown that solutions of the two polymers can be blended at all ratios. For the purpose of making carbon fiber reinforced laminates with superior mechanical properties, elevated temperature performance, and chemical resistance, we use about 2 percent to about 20 percent by weight of the coating PEI.

Woven fiber fabrics such as carbon fiber fabrics are impregnated with the blended solution to a level which will yield dry resin contents (DRC) ranging from 33 to 45 percent by weight. After drying to reduce solvent level to approximately 4%, multiple plies of coated fabric are consolidated into laminates by the application of heat and pressure. Typical consolidation pressures for PAI laminates are up to 1500 psi.

EXAMPLE XI

Three series of laminates were molded with pressures ranging from about 1500 to about 150 psi; one series using a polyamide-imide prepared as shown in Example I, one series using blended solution including 5% PEI (Ultem 1000, a polyetherimide manufactured by General Electric) and 95% of the same amide-imide powder solution, and one series using blended solutions including 10% PEI (Ultem 1000) and 90% of the same amide-imide powder solution. Considerable squeeze out (bleed) of excess polymer was observed on the unsupported edges of the molded laminates containing PEI. The degree of squeeze out increased with increased levels of PEI and with increased molding pressure. Resin starved area on the laminate surfaces also diminished with increased levels of PEI and with increased molding pressure.

Flexure and shear properties of the specimens are shown in Table 2. Data for the PEI blend samples show good retention of shear properties to 150 psi molding pressure, and good retention of flexure properties to 200 psi molding pressure. The density measurements indicate good consolidation to 300 psi molding pressure. The data indicates that both blend samples have significantly better processability than the 4000 (control) samples.

EXAMPLE XII

Woven silicon carbide fabric identified as Dow Corning Nicalon Silicon Carbide 8 Harness Satin was washed in acetone solvent to remove the epoxy size. The fabric was impregnated with a solution of polyamide-imide as prepared in Example I dissolved in NMP to give a solids content of 30%. Both the solution and the fabric were preweighed to yield a 30% dry resin content impregnated fabric after solvent extraction. The fabric was taped to a polyethylene film and the polyamide-imide solution was washed into the fabric with a polypropylene squeegee. The coated fabric was dried in a forced air oven for 4 days at room temperature, 2 hours at 250° F., 1 hour at 300° F., and 1 hour at 400° F. to lower the solvent content to about 1.5 wt. %. The fabric was cut to the desired dimensions with successive plys oriented 90° to each other. The plies were tacked together at two corners using a Seelye plastic welder with a tacking tip. The lay-up of four plys was placed in a vacuum bag autoclave to be molded. The vacuum bag autoclave had a 1 hour heatup time at full vacuum, a 15 minute dwell time at 660° F., a 15 minute time at 500 psig and 600° F., and was cooled at 500 psig to 300° F. at the maximum rate. The thickness of the laminate ranged from 0.045 to 0.048 inch with the laminate surface fairly uniform with a dark color, slightly semi-glossy and dry looking with fill fiber showing.

EXAMPLE XIII

N-methyl-2-pyrrolidone (NMP) is a solvent for polyamide-imide polymer of Example II and Trogamid-T an amorphous polyamide. A 27.5 percent solids solution of Trogamid-T in NMP was prepared as follows. The NMP (725 grams) was heated to 180° F., and stirred with a high shear blade mixer with sufficient speed to keep the Trogamid-T pellets from agglomerating when added to the solvent. The Trogamid-T pellets were added to the hot solvent over a 20-minute period. After about 1½ hours mixing, all pellets were dissolved. Mixing was continued for 2 hours after all pellets appeared to be dissolved. The solution was allowed to cool and sit 16 hours before using.

The Trogamid-T solution described above was blended with a polyamide-imide/NMP solution (27.5 percent solids) at a 95:5 weight ratio. The polyamide-imide solution was first heated to 150° F. The Trogamid solution was thus added, and the blend was stirred with a high shear mixer for four hours. The blended solution was allowed to cool and sit 16 hours before using.

The blended solution of polyamid-imide/Trogamid-T was used to coat carbon fiber unidirectional tape. The impregnated unitape was used to form a laminate.

TABLE 2

Effect of Mold Pressure on Properties of Polyamide-imide/Ultem Blend - Carbon Fabric Laminates

| Molding Pressure | SBS. (psi) | F.S. (psi) | F.M. (psi) | Density (g/cc) |
|---|---|---|---|---|
| Polyamide-imides as Shown in Example I (Control) | | | | |
| 1500 | 9.5 × 10³ | 139.9 × 10³ | 9.6 × 10⁶ | 1.596 |
| 1000 | 9.6 × 10³ | 132.5 × 10³ | 8.3 × 10⁶ | 1.606 |
| 750 | 9.4 × 10³ | 130.6 × 10³ | 8.3 × 10⁶ | 1.613 |
| 500 | 9.1 × 10³ | 123.2 × 10³ | 8.1 × 10⁶ | 1.601 |
| 300 | 9.6 × 10³ | 132.5 × 10³ | 8.3 × 10⁶ | 1.592 |
| 200 | 8.7 × 10³ | 120.9 × 10³ | 8.1 × 10⁶ | 1.585 |
| 150 | 9.0 × 10³ | 118.2 × 10³ | 7.9 × 10⁶ | 1.583 |
| Polyamide-imides as Shown in Example I With 5% Polyetherimide (Ultem 1000) | | | | |
| 1500 | — | — | — | — |
| 1000 | 9.9 × 10³ | 155.1 × 10³ | 9.5 × 10⁶ | 1.607 |
| 750 | 9.7 × 10³ | 153.6 × 10³ | 8.9 × 10⁶ | 1.599 |
| 500 | 9.5 × 10³ | 145.9 × 10³ | 9.5 × 10⁶ | 1.608 |
| 300 | 9.7 × 10³ | 149.7 × 10³ | 9.5 × 10⁶ | 1.590 |
| 200 | 9.8 × 10³ | 137.9 × 10³ | 8.9 × 10⁶ | 1.592 |
| 150 | 9.8 × 10³ | 137.9 × 10³ | 8.9 × 10⁶ | 1.592 |
| Polyamide-imides as Shown in Example I With 10% Polyetherimide (Ultem 1000) | | | | |
| 1500 | — | — | — | — |
| 1000 | 10.2 × 10³ | 142.9 × 10³ | 9.2 × 10⁶ | 1.606 |
| 750 | 9.7 × 10³ | 138.2 × 10³ | 8.8 × 10⁶ | 1.587 |
| 500 | 9.9 × 10³ | 138.1 × 10³ | 9.1 × 10⁶ | 1.596 |
| 300 | 10.2 × 10³ | 135.2 × 10³ | 9.6 × 10⁶ | 1.599 |
| 200 | 10.2 × 10³ | 142.2 × 10³ | 8.8 × 10⁶ | 1.575 |
| 150 | 9.8 × 10³ | 135.3 × 10³ | 9.1 × 10⁶ | 1.567 |

Note:
Celion 3000 8HS fabric with PI size was heat cleaned at 650° F. for 15 min. prior to impregnation.
SBS. — Short beam shear
F.S. — Flexural strength
F.M. — Flexural modulus
Ultem 1000 - Polyetherimide manufactured by General Electric

We claim:

1. A laminate comprising a multiplicity of thermally stable continuous fibers impregnated with a solution of an amide-imide polymer, said fibers coated with a sizing composition, said sizing composition comprising an amide-imide copolymer, said amide-imide copolymer comprising recurring A units of:

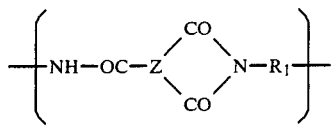

and B units of:

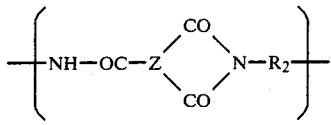

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

2. The laminate of claim 1 wherein said thermally stable continuous fibers are selected from the group consisting of glass, alumina, steel, silicon nitride, silicon carbide, boron, Kevlar, graphite or carbon fibers.

3. The laminate of claim 1 wherein $R_1$ is:

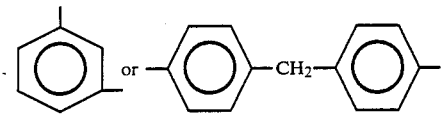

and $R_2$ is:

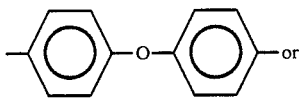

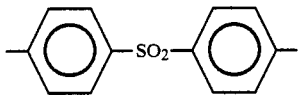

or wherein $R_1$ is:

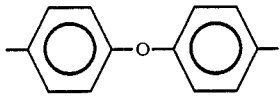

and $R_2$ is:

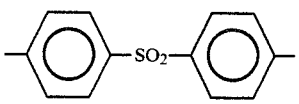

4. The laminate of claim 1 wherein Z is a trivalent benzene ring, $R_1$ is:

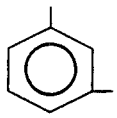

and $R_2$ is:

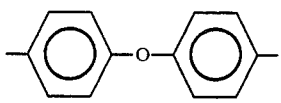

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

5. The laminate of claim 1 which laminate comprises about 0.1 to about 50 weight percent of a polyetherimide.

6. The polyetherimide of claim 5 comprising recurring units of the following structure:

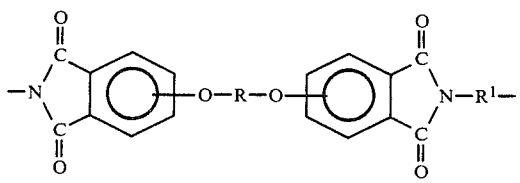

where R is a member selected from the class consisting of (a) the following divalent organic radicals:

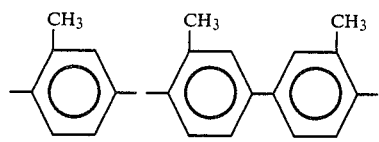

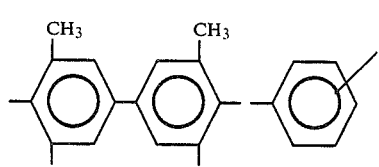

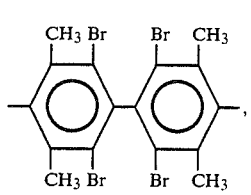

and

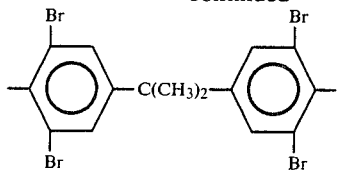

and (b) divalent organic radicals of the general formula:

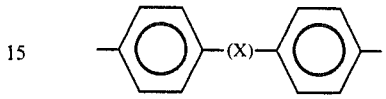

where X is $-C_yH_{2y}-$, y is a whole number equal to 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula:

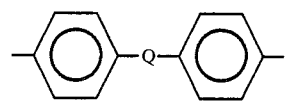

where Q is a member selected from the class consisting of:

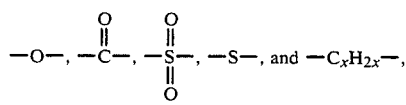

7. A laminate comprising a multiplicity of thermally stable continuous fibers impregnated with a solution of amide-imide copolymer, said amide-imide copolymer comprising recurring A units of:

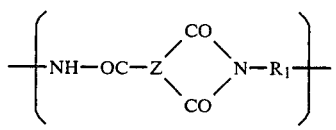

and B units of:

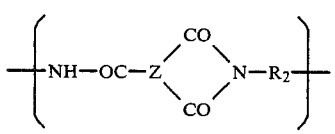

wherein one carbonyl group is meta to and one carbonyl group is para to each amide group and wherein Z is a trivalent benzene ring or lower-alky-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said R$_1$ and R$_2$ containing units run from about 10 mole percent R$_1$ containing unit and about 90 mole percent R$_2$ containing unit to about 90 mole percent R$_1$ containing unit and about 10 mole percent R$_2$ containing unit.

8. The laminate of claim 7 wherein said fiber comprises carbon fiber.

9. The laminate of claim 7 wherein R$_1$ is:

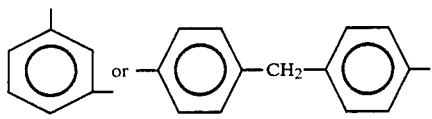

and R$_2$ is:

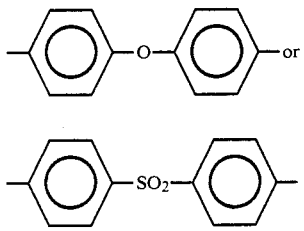

or wherein R$_1$ is:

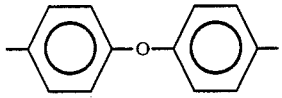

and R$_2$ is:

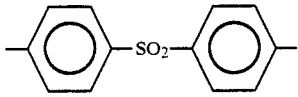

10. The laminate of claim 7 wherein Z is a trivalent benzene ring, R$_1$ is:

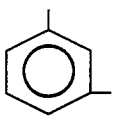

and R$_2$ is:

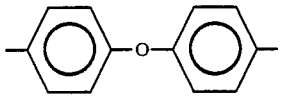

and wherein the concentration range runs from about 30 mole percent of the R$_1$ containing units and about 70 mole percent of the R$_2$ containing units to about 70 mole percent of the R$_1$ containing units and about 30 mole percent of the R$_2$ containing units.

11. The laminate of claim 7 which laminate comprises about 0.1 to about 50 weight percent of a polyetherimide.

12. The polyetherimide of claim 11 comprising recurring units of the following structure:

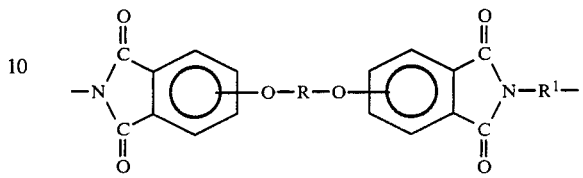

where R is a member selected from the class consisting of (a) the following divalent organic radicals:

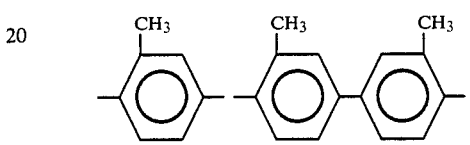

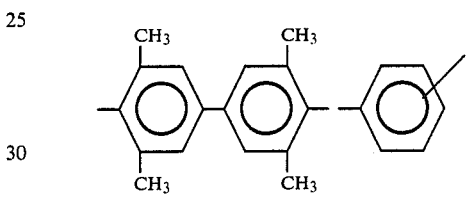

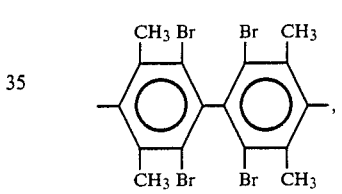

and

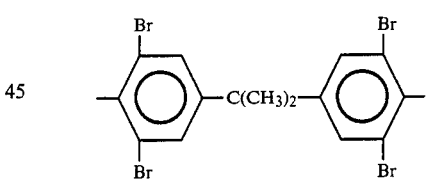

and (b) divalent organic radicals of the general formula:

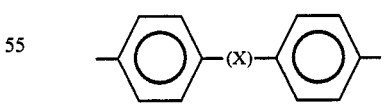

where X is —C$_y$H$_{2y}$—, y is a whole number equal to 1 to 5 inclusive, and R$^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) C$_{(2-8)}$ alkylene terminated polydiorganosiloxanes, and (d) divalent radicals included by the formula:

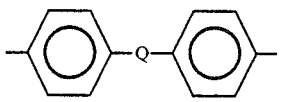

where Q is a member selected from the class consisting of:

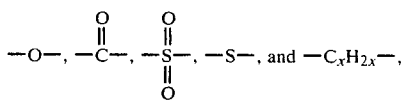

13. A laminate comprising a multiplicity of thermally stable continuous fibers impregnated with a solution of amide-imide copolymer, said amide-imide copolymer comprising recurring A' units of:

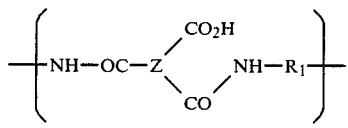

and B' units of:

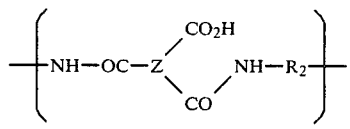

wherein the free carboxyl groups are ortho to one amide group, Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

14. The laminate of claim 13 wherein said fiber comprises carbon fiber.

15. The laminate of claim 13 wherein $R_1$ is:

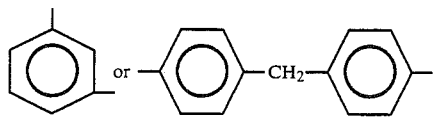

and $R_2$ is:

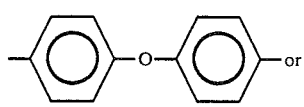

or wherein $R_1$ is:

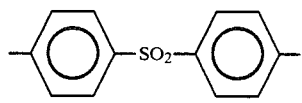

-continued

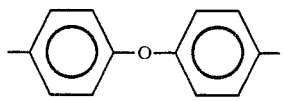

and $R_2$ is:

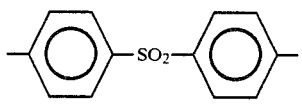

16. The laminate of claim 13 wherein Z is a trivalent benzene ring, $R_1$ is:

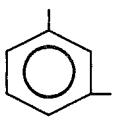

and $R_2$ is:

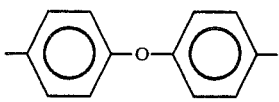

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

17. The laminate of claim 16 which laminate comprises about 0.1 to about 50 weight percent of a polyetherimide.

18. The polyetherimide of claim 17 comprising recurring units of the following structure:

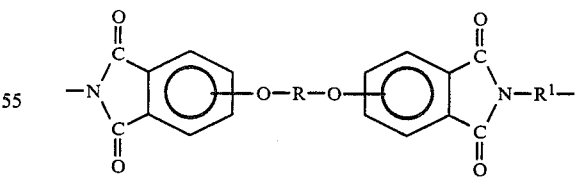

where R is a member selected from the class consisting of (a) the following divalent organic radicals:

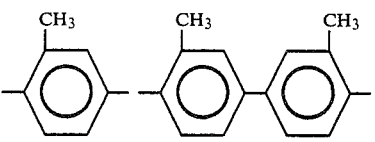

-continued

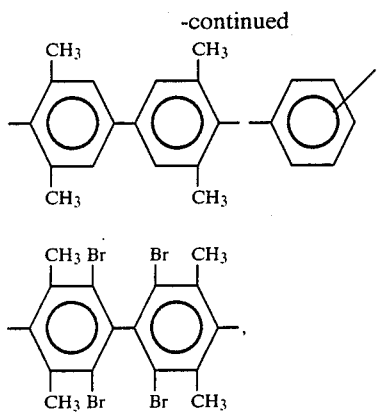

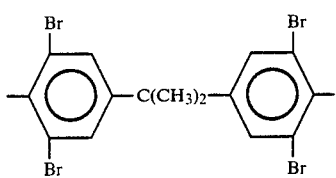

and

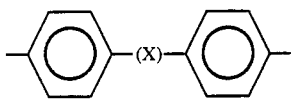

and (b) divalent organic radicals of the general formula:

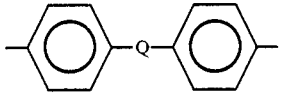

where X is —$C_yH_{2y}$—, y is a whole number equal to 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula:

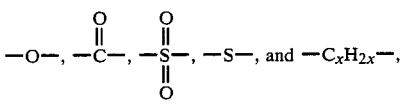

where Q is a member selected from the class consisting of:

$$-O-, -\overset{O}{\underset{\|}{C}}-, -\overset{O}{\underset{\underset{\|}{O}}{\overset{\|}{S}}}-, -S-, \text{ and } -C_xH_{2x}-,$$

19. The laminate of claim 13 which laminate comprises about 0.1 to about 50 weight percent of a polyetherimide.

20. The polyetherimide of claim 19 comprising recurring units of the following structure:

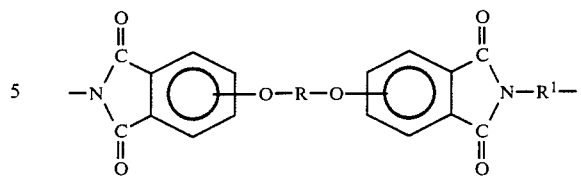

where R is a member selected from the class consisting of (a) the following divalent organic radicals:

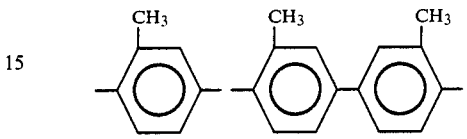

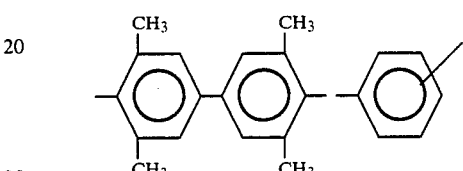

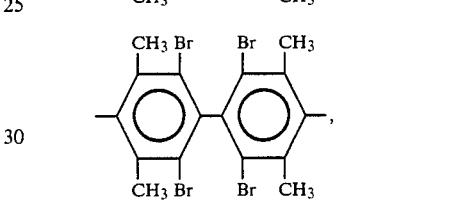

and

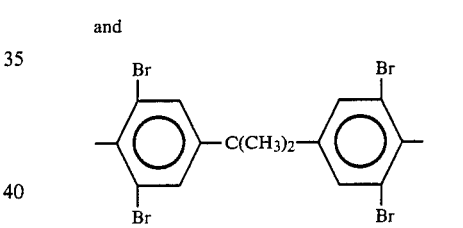

and (b) divalent organic radicals of the general formula:

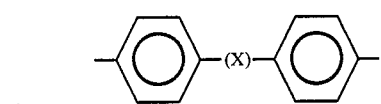

where X is —$C_yH_{2y}$—, y is a whole number equal to 1 to 5 inclusive, and $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, (c) $C_{(2-8)}$ alkylene terminated polydiorganosiloxanes, and (d) divalent radicals included by the formula:

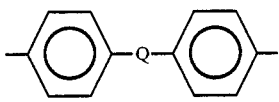

where Q is a member selected from the class consisting of:

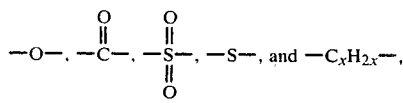

21. A laminate comprising a multiplicity of carbon fiber woven fabric layers impregnated with a solution of an amide-imide polymer, wherein said amide-imide polymer comprises a blend of a component A and a component B, said component A comprising an amide-imide copolymer, said amide-imide copolymer comprising units of:

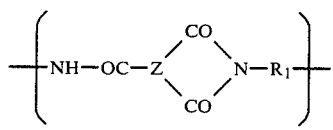

and units of:

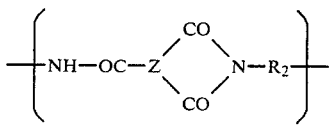

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit and said component B comprising an amide-imide-phthalamide compolymer, said amide-imide-phthalamide copolymer comprising C units of:

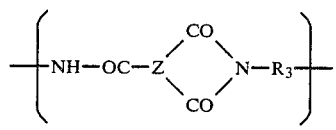

and D units of:

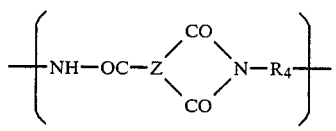

and E units of:

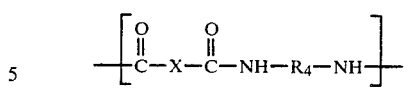

wherein the molar ratio of E units to the total of C and D units is about 20:80 to about 80:20 and wherein $R_5$ is the same as $R_1$ and as $R_4$ and X is a divalent aromatic radical wherein one carbonyl group is meta to and one carbonyl group is para to each amide group and wherein Z is a trivalent benzene ring or lower-alkyl-substituted trivalent benzene ring, $R_3$ and $R_4$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_3$ and $R_4$ containing units run from about 10 mole percent $R_3$ containing unit and about 90 mole percent $R_4$ containing unit to about 90 mole percent $R_3$ containing unit and about 10 mole percent $R_4$ containing unit wherein said laminate contains about 20 to about 80 percent by weight of component A and about 80 to about 20 percent by weight of component B.

22. The laminate of claim 21 wherein $R_1$ is:

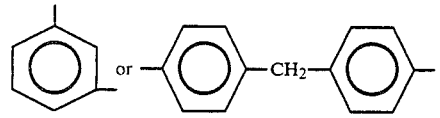

and $R_2$ is:

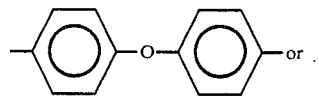

or wherein $R_1$ is:

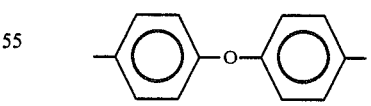

and $R_2$ is:

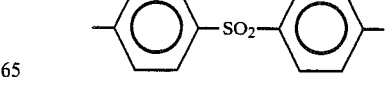

23. The laminate of claim 21 wherein Z is a trivalent benzene ring, $R_1$ is:

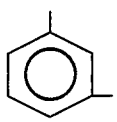

and R₂ is:

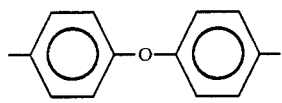

and wherein the concentration range runs from about 30 mole percent of the R₁ containing units and about 70 mole percent of the R₂ containing units to about 70 mole percent of the R₁ containing units and about 30 mole percent of the R₂ containing units.

24. The laminate of claim 21 which laminate comprises about 0.1 to about 50 weight percent of a polyetherimide.

25. The polyetherimide of claim 24 comprising recurring units of the following structure:

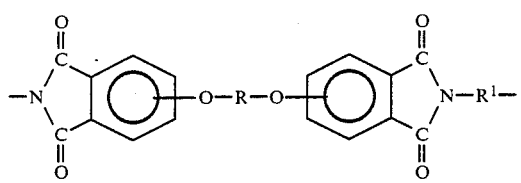

where R is a member selected from the class consisting of (a) the following divalent organic radicals:

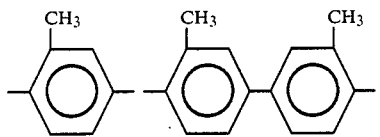

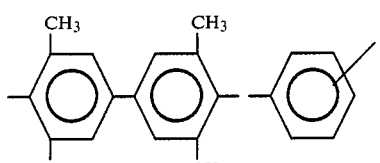

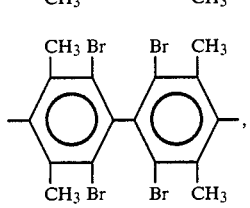

and

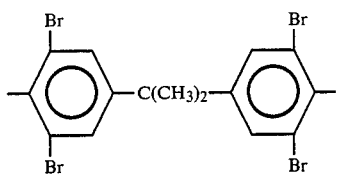

and (b) divalent organic radicals of the general formula:

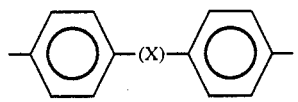

where X is —$C_yH_{2y}$—, y is a whole number equal to 1 to 5 inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula:

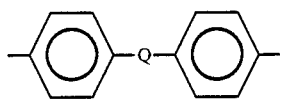

where Q is a member selected from the class consisting of:

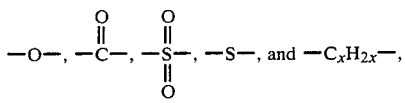

26. A laminate comprising a multiplicity of carbon fiber woven fabric layers impregnated with a solution of an amide-imide polymer, wherein said amide-imide polymer comprises a blend of a component A′ and a component B′, said component A′ comprising units of:

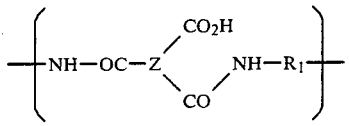

and units of:

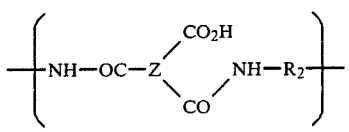

wherein the free carboxyl groups are ortho to one amide group, Z is a trivalent benzene ring or lower-alkyl-substituted trivalent benzene ring, R₁ and R₂ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO₂—, and —S— radicals and wherein said R₁ and R₂ containing units run from about 10 mole per cent R₁ containing unit and about 90 mole percent R₂ containing unit and about 90 mole percent R₁ containing unit and about 10 mole per cent R₂ containing unit and said component B′ comprising C units of:

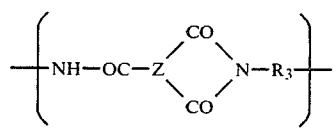

and D units of:

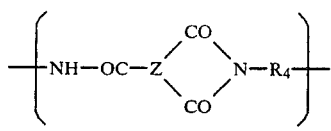

and E units of:

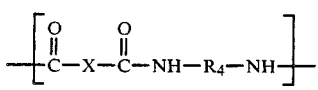

wherein the molar ratio of E units to the total of C and D units is about 5:95 to 80:20 and wherein $R_5$ is the same as $R_3$ and as $R_4$ and X is a divalent aromatic radical wherein one carbonyl group is meta to and one carbonyl group is para to each amide group and wherein Z is a trivalent benzene ring or lower-alkyl-substituted trivalent benzene ring, $R_3$ and $R_4$ are different and are divalent aromatic hydrocarbon radicals of from about 6 to about 10 carbon atoms or two divalent aromatic hydrocarbon radicals of from about 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit wherein the fiber laminate contains about 20 to about 80 percent by weight of component A' and about 80 to about 20 percent by weight of component B'.

27. The laminate of claim 26 wherein X is:

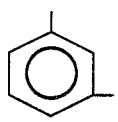

28. The of claim 26 wherein $R_1$ is:

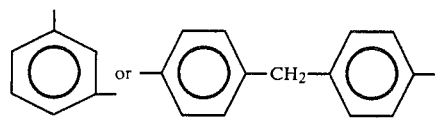

and $R_2$ is:

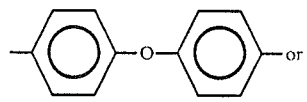

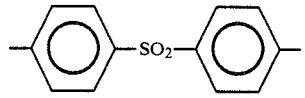

or wherein $R_1$ is:

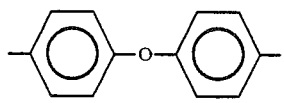

and $R_2$ is:

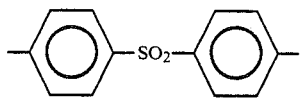

29. The laminate of claim 26 wherein Z is a trivalent benzene ring, $R_1$ is:

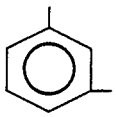

and $R_2$ is:

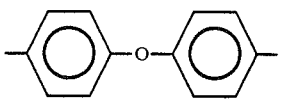

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

* * * * *

UNITED STATES PATENT OFFICE
CERTIFICATE OF CORRECTION

Patent No. 4,579,773          Dated April 1, 1986

Inventor(s) Bill W. Cole and Gary T. Brooks

It is certified that error appears in the above-identified patent and that said Letters Patent are hereby corrected as shown below:

Patent reads:

| Col. | Line | | |
|---|---|---|---|
| 3 | 15 | "with out" and should read | --with our-- |
| 13 | 27 | "Example 1" and should read | --Example I-- |
| 17 | 29 | "polyamid-imide" and should read | --polyamide-imide-- |
| 28 | 5 | "$\{C-X-C-NH-R_4-NH\}$" and should read | $\{C-X-C-NH-R_5-NH\}$ |
| 31 | 23 | "$\{C-X-C-NH-R_4-NH\}$" and should read | $\{C-X-C-NH-R_5-NH\}$ |

UNITED STATES PATENT AND TRADEMARK OFFICE
CERTIFICATE OF CORRECTION

PATENT NO. : 4,579,773  Page 2 of 2

DATED : April 1, 1986

INVENTOR(S) : Bill W. Cole et al.

It is certified that error appears in the above-identified patent and that said Letters Patent is hereby corrected as shown below:

Col. 31, line 28, "$R_3$" should read --$R_1$--

Col. 31, line 57, "The of" should read --The laminate of--.

Signed and Sealed this

Ninth Day of September 1986

[SEAL]

Attest:

DONALD J. QUIGG

Attesting Officer    Commissioner of Patents and Trademarks